United States Patent
Lu et al.

(10) Patent No.: US 12,123,699 B1
(45) Date of Patent: Oct. 22, 2024

(54) SYSTEM AND METHOD FOR DETECTING THICKNESS AND BOW OF LARGE-SIZED WAFERS

(71) Applicant: WUXI XIVI SCIENCE AND TECHNOLOGY CO., LTD., Wuxi (CN)

(72) Inventors: Minjie Lu, Wuxi (CN); Zhaokun Wang, Wuxi (CN)

(73) Assignee: WUXI XIVI SCIENCE AND TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/632,298

(22) Filed: Apr. 11, 2024

(51) Int. Cl.
*G01B 11/02* (2006.01)
*G01B 11/06* (2006.01)
*G01B 11/24* (2006.01)
*H04N 23/695* (2023.01)

(52) U.S. Cl.
CPC ............ *G01B 11/022* (2013.01); *G01B 11/06* (2013.01); *G01B 11/2441* (2013.01); *H04N 23/695* (2023.01)

(58) Field of Classification Search
None
See application file for complete search history.

(56) References Cited

U.S. PATENT DOCUMENTS

2009/0084169 A1 * 4/2009 Bailey, III ............. G01B 21/20
73/104

OTHER PUBLICATIONS

CNIPA, Notification of First Office Action for CN202310151463.7, Aug. 31, 2023.
Wuxi Xivi Science and Technology Co., Ltd. (Applicant), Reply to Notification of First Office Action for CN202310151463.7, w/ (allowed) replacement claims, Sep. 4, 2023.
CNIPA, Notification to grant patent right for invention in CN202310151463.7, Oct. 16, 2023.

* cited by examiner

*Primary Examiner* — Stuart D Bennett
(74) *Attorney, Agent, or Firm* — Hemisphere Law, PLLC; Zhigang Ma

(57) ABSTRACT

A system for detecting a thickness and a bow of a large-sized wafer and a method for detecting a thickness and a bow of a large-sized wafer are provided and relate to wafer detection, the system includes a transportation mechanism, a handling mechanism and a detection mechanism. The transportation mechanism includes a transportation belt and is configured to transport the wafer. The handling mechanism includes a mechanical arm, an end of the mechanical arm is provided with multiple vacuum suction cups, and the handling mechanism is configured to transport the wafer from the handling mechanism to the detection mechanism. The detection mechanism includes a bearing structure and an optical detection structure, and is configured to detect the thickness and the bow of the wafer. The bearing structure includes multiple strings configured to bear the wafer. The optical detection structure includes a camera and a liquid crystal display (LCD) panel.

20 Claims, 3 Drawing Sheets

SYSTEM AND METHOD FOR DETECTING THICKNESS AND BOW OF LARGE-SIZED WAFERS

TECHNICAL FIELD

The disclosure relates to the technical field of wafer detection, and particularly to a system for detecting a thickness and a bow of a large-sized wafer and a method for detecting a thickness and a bow of a large-sized wafer.

BACKGROUND

Wafer is the basic material of semiconductor chips, and a thickness and a bow of the wafer are important factors in wafer detection, which are related to outgoing quality of the wafer. There are various wafer detection methods in the related art, including a probe method and an image method, which usually require placing the wafer on a carrier.

However, rigidity of the wafer itself is weak, and due to its gravity, it can cause deformation of the wafer. Therefore, some methods use a triple elimination method of reference wafer inversion, sample wafer inversion, and theoretical modeling to eliminate an influence of gravity. Some methods use vertical support systems for optical acquisition. Some methods use a rotation method, which rotates the wafer during a detecting process to eliminate the influence of gravity on certain areas. Some methods use three-point support, which means setting up three support points at an edge of the wafer in an equilateral triangle shape to reduce bending caused by edge gravity. However, for large-sized wafers, even with multi-point or vertical support, the influence of gravity on some unsupported areas cannot be eliminated, which can lead to inaccurate thickness and bow detection of the wafer.

SUMMARY

The purpose of the disclosure is to solve the problems existing in the related art and provide a system for detecting a thickness and a bow of a large-sized wafer and a method for detecting a thickness and a bow of a large-sized wafer.

The disclosure is achieved through the following technical solutions.

A system for detecting a thickness and a bow of a wafer includes a transportation mechanism, a handling mechanism and a detection mechanism. The transportation mechanism includes a transportation belt and is configured to transport a wafer to be detected. The handling mechanism includes a mechanical arm, an end of the mechanical arm is provided with multiple vacuum suction cups, and the handling mechanism is configured to transport the wafer to be detected from the handling mechanism to the detection mechanism. The detection mechanism includes a bearing structure and an optical detection structure, and is configured to detect the thickness and the bow of the wafer to be detected. Specifically, the bearing structure includes multiple strings arranged in parallel and the multiple strings are configured to bear the wafer to be detected, and a distance of adjacent two of the multiple strings is in a range of 1.5-2.3 centimeters (cm). The optical detection structure includes a camera and a liquid crystal display (LCD) panel, the camera is capable of rotating 360 degree (°), and the camera is configured to rotate 900 successively to take four interference fringe images of the wafer to be detected. And the LCD panel is configured to project a grating onto the wafer to be detected.

In an embodiment, the multiple vacuum suction cups are four vacuum suction cups, one of the four vacuum suction cups is configured to adsorb a center of the wafer to be detected and remaining three of the four vacuum suction cups are configured to adsorb an edge of the wafer to be detected to form an equilateral triangle distribution. The handling mechanism includes an image recognition unit, the image recognition unit is configured to identify the edge and the center of the wafer to be detected by taking pictures of the wafer to be detected, and the four vacuum suction cups are placed at the edge and the center of the wafer to be detected correspondingly.

In an embodiment, the optical detection structure includes a controller and a spectroscope. The controller is electrically connected to the LCD panel and the camera to configure to control a shape of the grating projected from the LCD panel, receive image data collected by the camera, and calculate the thickness and the bow of the wafer to be detected based on the collected image data. The spectroscope is disposed to tilt relative to the wafer to be detected, the LCD panel is disposed vertically relative to the wafer to be detected and the camera is disposed above the spectroscope to capture the four interference fringe images of the wafer to be detected. The controller is configured to control the grating projected from the LCD panel to be vertical or horizontal.

Calculation formulas for the bow of the wafer to be detected are as follow:

a bow along an x-axis direction of the wafer to be detected is:

$$\left(\frac{\partial \Phi(x)}{\partial x}\right)\left(\frac{p}{4\pi L \Delta x}\right) \times a;$$

a bow along a y-axis direction of the wafer to be detected is:

$$\left(\frac{\partial \Phi(y)}{\partial y}\right)\left(\frac{p}{4\pi L \Delta y}\right) \times a; \text{ and}$$

where $\Phi(x, y) = \tan^{-1}\left(\frac{I_{270} - I_{90}}{I_0 - I_{180}}\right)$, and $$\frac{\partial \Phi(x1)}{\partial x} = \frac{\Phi(x2) - \Phi(x1)}{x2 - x1}, \frac{\partial \Phi(y1)}{\partial y} = \frac{\Phi(y2) - \Phi(y1)}{y2 - y1};$$

where x, y, $x_1$, $x_2$, $y_1$ and $y_2$ represent pixel coordinate values; $I_0$, $I_{90}$, $I_{180}$ and $I_{270}$, represent grayscale values of interference fringe images captured by the camera at 0°, 90°, 180°, and 270°, respectively; p represents a distance between adjacent two interference fringes in pixels; L represents a sum of a horizontal distance from the LCD panel to a center of the spectroscope and a vertical distance from the center of the spectroscope to the wafer to be detected; $\Delta x$ and $\Delta y$ represent minimum recognizable pixel distances of the pixels; a represents a correction factor related to lens parameters of the camera.

a formula for the thickness of the wafer to be detected is as follow:

$$t(x,y) = b^* \Phi(x, y) + c$$

where b and c represent pre-calibrated parameters for the camera, and t(x, y) represents the thickness of the wafer to be detected at a coordinate of (x, y).

A method for detecting the thickness and the bow of the wafer by using the system mentioned above is provided and includes the following steps.

Step 1: transporting the wafer to be detected to a target position by the transportation mechanism;

step 2: transporting the wafer to be detected to the bearing structure through the multiple vacuum suction cups;

step 3: controlling the LCD panel to project the grating by the controller, and rotating the camera 90° successively for 4 times to obtain the four interference fringe images of the wafer to be detected; and step 4: obtaining the bow and the thickness of the wafer to be detected based on the four interference fringe images of the wafer to be detected.

A computer device is provided and includes a processor and a memory. The memory stores computer executable instructions executable by the processor, and the processor is configured to execute the computer executable instructions to implement the method mentioned above.

A computer-readable storage medium storing computer executable instructions is provided. When the computer executable instructions are called and executed by the processor, the computer executable instructions are configured to make the processor to implement the method mentioned above. The computer-readable storage medium is a non-transitory computer-readable storage medium.

Compared with the related art, the beneficial effects of the disclosure are as follows:

1. Through the support of the multiple strings, uniform support is achieved for multiple positions on the wafer, minimizing distortion and deformation caused by the gravity in the edge or center area of the wafer, and improving detection accuracy.
2. The traditional optical interferometry method uses projectors and charge coupled device (CCD) cameras for optical detection, which has a complex system structure and cumbersome system calibration. However, the optical detection structure in the disclosure only uses a simple structure with the LCD reflector (LCD panel), the spectroscope, and the controller.

The device ensures detection accuracy, improves detection efficiency and reduces structural complexity.

DETAILED DESCRIPTION OF EMBODIMENTS

The following is a further detailed description of the disclosure in conjunction with the attached drawings.

Figure 1:
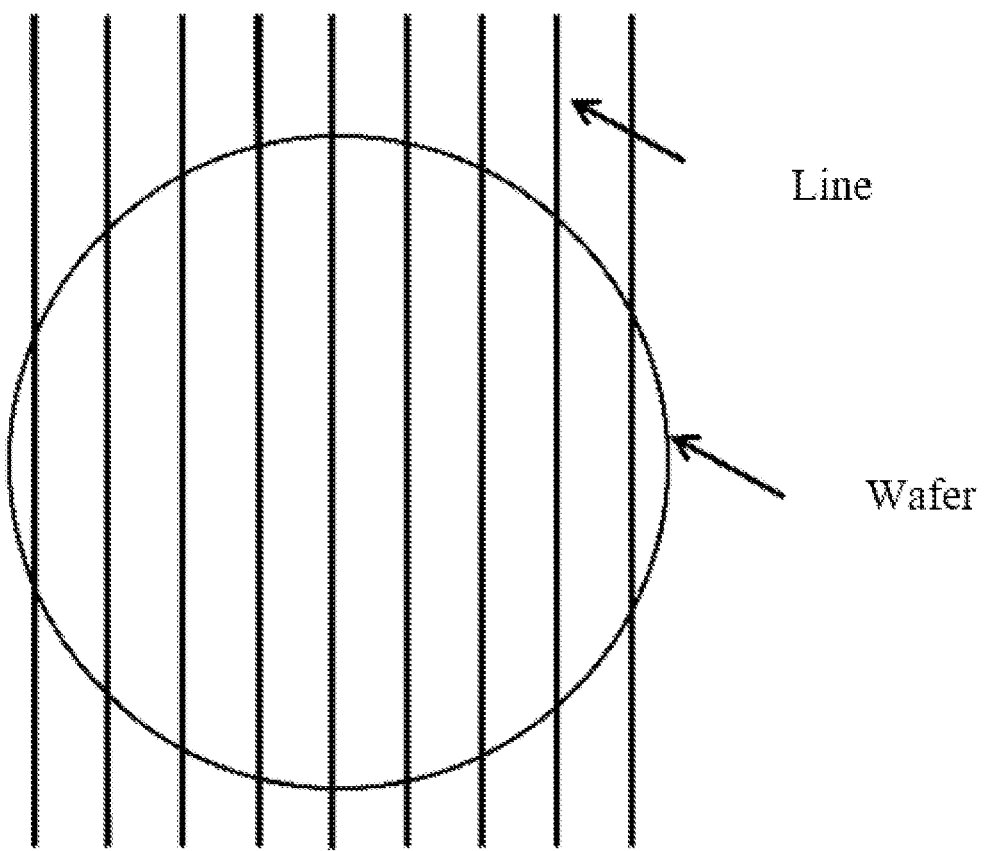
FIG. 1 illustrates a schematic structural diagram of a bearing structure of the disclosure.

A system for detecting a thickness and a bow of a large-sized wafer is provided and includes a transportation mechanism, a handling mechanism and a detection mechanism. The transportation mechanism includes a transportation belt and is configured to transport the wafer to be detected. The handling mechanism includes a mechanical arm, an end of the mechanical arm is provided with vacuum suction cups, and the handling mechanism is configured to transport the wafer to be detected from the handling mechanism to the detection mechanism. The detection mechanism includes a bearing structure and an optical detection structure, and is configured to detect the thickness and the bow of the wafer to be detected. As shown in FIG. 1, the bearing structure includes multiple strings arranged in parallel which are configured to bear (i.e., support) the wafer to be detected. The strings are disposed at equal intervals to provide stable supports for the wafer to be detected, and unnecessary bending caused by gravity effects is effectively prevented. During the working process, the wafer to be detected is transported to a position by the transportation mechanism, then the handling mechanism is moved to a position of the transportation mechanism. Images of the wafer to be detected are captured by the handling mechanism to identify a center and an edge area of the wafer to be detected. The end of the mechanical arm is provided with four vacuum suction cups, one of the four vacuum suction cups is configured to adsorb the center of the wafer to be detected and rest of the vacuum suction cups are configured to adsorb the edge of the wafer to be detected to form an equilateral triangle distribution. The handling mechanism places the four vacuum suction cups to absorb the center and the edge of the wafer to be detected correspondingly, and followed by transporting the wafer to be detected on the multiple strings of the bearing structure. Specifically, a distance of adjacent two of the multiple strings is in a range of 1.5-2.3 centimeters (cm).

Figure 2:
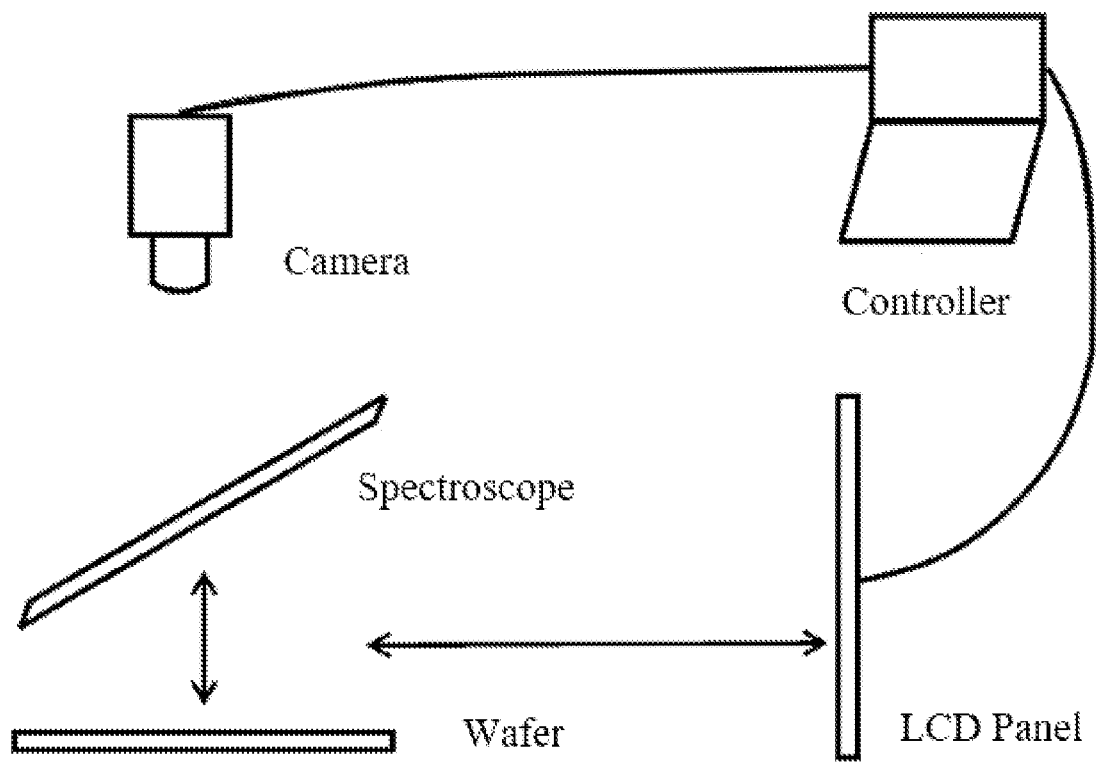
FIG. 2 illustrates a schematic structural diagram of an optical detection structure of the disclosure.
Figure 3:
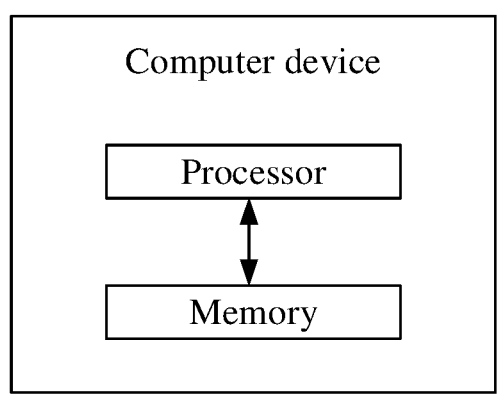
FIG. 3 illustrates a schematic diagram of a computer device of the disclosure.
Figure 4:
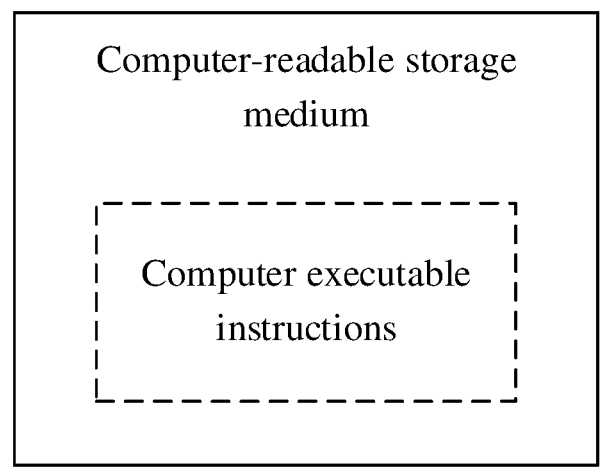
FIG. 4 illustrates a schematic diagram of a computer-readable storage medium of the disclosure.

As shown in FIG. 2, the optical detection structure includes a controller, a camera, a LCD panel and a spectroscope. The controller is electrically connected to the LCD panel and the camera to control the shape of the grating displayed from the LCD panel and receive image data collected by the camera. The spectroscope is disposed obliquely relative to the wafer to be detected, and the camera is disposed above the spectroscope. During the working process, the controller controls the grating projected from the LCD panel to be vertical or horizontal (i.e., the controller controls the LCD panel to display vertical or horizontal grating), the spectroscope projects the grating onto the wafer to be detected, and the camera captures the image of the wafer with the projection grating, which is the image of the wafer to be detected with interference fringes. By calculating the deformation of the grating, the bow of the object (i.e., wafer) can be obtained.

Before conducting specific detections, it is necessary to calibrate the optical system to determine the relationship between spatial objects and images. In the disclosure, in order to establish the optical path system, it is necessary to ensure that the imaging optical axis of the camera is perpendicular to the wafer to be detected, and the LCD panel is disposed perpendicular to the wafer to be detected, that is, the imaging optical axis of the camera and LCD panel need to be perpendicular to the measurement platform (i.e., the wafer).

After capturing the interference fringe images, the camera needs to perform simple preprocessing on the interference fringe images, which includes image brightness processing, image binarization, image expansion, and image corrosion.

In an embodiment, the grayscale values of the stripes generated by grating projection can be represented by equations as follows:

$$I_0(x,y)=A+B\cos[\Phi(x,y)+0\pi] \tag{1}$$

$$I_{90}(x,y)=A+B\cos[\Phi(x,y)+0.5\pi] \tag{2}$$

$$I_{180}(x,y)=A+B\cos[\Phi(x,y)+\pi] \tag{3}$$

$$I_{270}(x, y)=A+B \cos[\Phi(x, y)+1.5\pi] \quad (4)$$

where A and B represents an ambient light intensity and a modulated light intensity, respectively.

by solving equations (1) to (4) above, the phase $\Phi$ can be obtained as follows:

$$\Phi(x, y) = \tan^{-1}\left(\frac{I_{270} - I_{90}}{I_0 - I_{180}}\right); \text{ and} \quad (5)$$

$$\frac{\partial \Phi(x1)}{\partial x} = \frac{\Phi(x2) - \Phi(x1)}{x2 - x1}, \quad (6)$$

$$\frac{\partial \Phi(y1)}{\partial y} = \frac{\Phi(y2) - \Phi(y1)}{y2 - y1}; \quad (7)$$

according to the equations for phase shift and phase unwrapping, a bow along an x-axis direction of the wafer to be detected is obtained as follows:

$$\left(\frac{\partial \Phi(x)}{\partial x}\right)\left(\frac{p}{4\pi L \Delta x}\right) \times a; \quad (8)$$

and a bow along a y-axis direction of the wafer to be detected is obtained as follows:

$$\left(\frac{\partial \Phi(y)}{\partial y}\right)\left(\frac{p}{4\pi L \Delta y}\right) \times a. \quad (9)$$

Where x, y, $x_1$, $x_2$, $y_1$, $y_2$ represent pixel coordinate values; $I_0$, $I_{90}$, $I_{180}$, $I_{270}$, represent interference fringe images captured by the camera at 0°, 90°, 180°, and 270°, respectively; p represents a distance between adjacent two interference fringes in pixels; L represents a sum of a horizontal distance from the LCD panel to a center of the spectroscope and a vertical distance from the center of the spectroscope to the wafer to be detected; $\Delta x$, $\Delta y$ represent minimum recognizable pixel distances of the pixels; a represents a correction factor related to lens parameters of the camera. By substituting equations (5) to (7) into equations (8) and (9), the bow of the wafer to be detected can be obtained. Furthermore, the bow of the wafer can be calculated based on the general bow formula, which is a common knowledge in the related art.

The thickness of the wafer to be detected can be obtained by the formula as follows:

$$t(x,y)=b*\Phi(x, y)+c;$$

where b and c represent pre-calibrated parameters for the camera, and t(x, y) represents the thickness of the wafer to be detected at a coordinate of (x, y).

In the description of the disclosure, it should be noted that unless otherwise specified and limited, the terms "connected to" and "connection" should be broadly understood, for example, they can be fixed connections, detachable connections, or integrated connections, can be mechanical connections or electrical connections, and can be direct connections or indirect connections through intermediate media. For those skilled in the art, the specific meanings of the above terms in the disclosure can be understood in specific situations.

In the description of the disclosure, unless otherwise specified, the terms "up", "down", "left", "right", "inside", "outside", etc. indicate orientation or positional relationships based on the orientation or positional relationships shown in the drawings, only for the convenience of describing the disclosure and simplifying the description, and not to indicate or imply that the device or element referred to must have a specific orientation, be constructed and operated in a specific orientation, Therefore, it cannot be understood as a limitation on the disclosure.

Finally, it should be noted that the above technical solution is only one embodiment of the disclosure. For those skilled in the art, it is easy to make various types of improvements or deformations based on methods and principles of the disclosure, and is not limited to the methods described in the specific embodiment of the disclosure. Therefore, the methods described earlier are only a specific embodiment and do not have restrictive significance.

What is claimed is:

1. A system for detecting a thickness and a bow of a wafer, comprising: a transportation mechanism, a handling mechanism and a detection mechanism;

wherein the transportation mechanism comprises: a transportation belt and is configured to transport the wafer;

wherein the handling mechanism comprises: a mechanical arm, an end of the mechanical arm is provided with a plurality of vacuum suction cups, and the handling mechanism is configured to transport the wafer from the handling mechanism to the detection mechanism;

wherein the detection mechanism comprises: a bearing structure and an optical detection structure, and is configured to detect the thickness and the bow of the wafer;

wherein the bearing structure comprises: a plurality of strings arranged in parallel and the plurality of strings are configured to bear the wafer, and a distance of adjacent two of the plurality of strings is in a range of 1.5-2.3 centimeters (cm);

wherein the optical detection structure comprises: a camera and a liquid crystal display (LCD) panel, the camera is capable of rotating 360 degree (°), and the camera is configured to rotate 900 successively to take four interference fringe images of the wafer; and the LCD panel is configured to project a grating onto the wafer.

2. The system for detecting the thickness and the bow of the wafer as claimed in claim 1, wherein the plurality of vacuum suction cups are four vacuum suction cups, one of the four vacuum suction cups is configured to adsorb a center of the wafer and remaining three of the four vacuum suction cups are configured to adsorb an edge of the wafer to form an equilateral triangle distribution.

3. The system for detecting the thickness and the bow of the wafer as claimed in claim 2, wherein the handling mechanism comprises: an image recognition unit, the image recognition unit is configured to identify the edge and the center of the wafer by taking pictures of the wafer, and the four vacuum suction cups are placed at the edge and the center of the wafer correspondingly.

4. The system for detecting the thickness and the bow of the wafer as claimed in claim 1, wherein the optical detection structure further comprises a controller and a spectroscope; the controller is electrically connected to the LCD panel and the camera to configure to control a shape of the grating projected from the LCD panel, receive image data collected by the camera, and calculate the thickness and the bow of the wafer based on the collected image data; the spectroscope is disposed to tilt relative to the wafer, the LCD panel is disposed vertically relative to the wafer and the camera is disposed above the spectroscope to capture the four interference fringe images of the wafer.

5. The system for detecting the thickness and the bow of the wafer as claimed in claim 4, wherein the controller is configured to control the grating projected from the LCD panel to be vertical or the controller is configured to control the grating projected from the LCD panel to be horizontal.

6. The system for detecting the thickness and the bow of the wafer as claimed in claim 4, wherein calculation formulas for the bow of the wafer are as follow:

a bow along an x-axis direction of the wafer is:

$$\left(\frac{\partial \Phi(x)}{\partial x}\right)\left(\frac{p}{4\pi L \Delta x}\right) \times a;$$

a bow along a y-axis direction of the wafer is:

$$\left(\frac{\partial \Phi(y)}{\partial y}\right)\left(\frac{p}{4\pi L \Delta y}\right) \times a; \text{ and}$$

where $\Phi(x, y) = \tan^{-1}\left(\frac{I_{270} - I_{90}}{I_0 - I_{180}}\right)$, and $$\frac{\partial \Phi(x1)}{\partial x} = \frac{\Phi(x2) - \Phi(x1)}{x2 - x1}, \frac{\partial \Phi(y1)}{\partial y} = \frac{\Phi(y2) - \Phi(y1)}{y2 - y1};$$

wherein x, y, $x_1$, $x_2$, $y_1$, an $y_2$ represent pixel coordinate values; $I_0$, $I_0$, $I_{180}$, an $I_{270}$ represent grayscale values of interference fringe images captured by the camera at 0°, 90°, 180°, and 270°, respectively; p represents a distance between adjacent two interference fringes in pixels; L represents a sum of a horizontal distance from the LCD panel to a center of the spectroscope and a vertical distance from the center of the spectroscope to the wafer; Δx and Δy represent minimum recognizable pixel distances of the pixels; a represents a correction factor related to lens parameters of the camera;

wherein a formula for the thickness of the wafer is as follow:

$$t(x,y)=b*\Phi(x, y)+c$$

where b and c represent pre-calibrated parameters for the camera, and t(x, y) represents the thickness of the wafer at a coordinate of (x, y).

7. A method for detecting the thickness and the bow of the wafer used the system as claimed in claim 1, comprising:
step 1: transporting the wafer to a target position by the transportation mechanism;
step 2: transporting the wafer to the bearing structure through the plurality of vacuum suction cups;
step 3: controlling the LCD panel to project the grating by a controller of the optical detection structure, and rotating the camera 90° successively for 4 times to obtain the four interference fringe images of the wafer; and
step 4: obtaining the bow and the thickness of the wafer based on the four interference fringe images of the wafer.

8. A method for detecting the thickness and the bow of the wafer used the system as claimed in claim 2, comprising:
step 1: transporting the wafer to a target position by the transportation mechanism;
step 2: transporting the wafer to the bearing structure through the plurality of vacuum suction cups;
step 3: controlling the LCD panel to project the grating by a controller of the optical detection structure, and rotating the camera 90° successively for 4 times to obtain the four interference fringe images of the wafer; and
step 4: obtaining the bow and the thickness of the wafer based on the four interference fringe images of the wafer.

9. A method for detecting the thickness and the bow of the wafer used the system as claimed in claim 3, comprising:
step 1: transporting the wafer to a target position by the transportation mechanism;
step 2: transporting the wafer to the bearing structure through the plurality of vacuum suction cups;
step 3: controlling the LCD panel to project the grating by a controller of the optical detection structure, and rotating the camera 90° successively for 4 times to obtain the four interference fringe images of the wafer; and
step 4: obtaining the bow and the thickness of the wafer based on the four interference fringe images of the wafer.

10. A method for detecting the thickness and the bow of the wafer used the system as claimed in claim 4, comprising:
step 1: transporting the wafer to a target position by the transportation mechanism;
step 2: transporting the wafer to the bearing structure through the plurality of vacuum suction cups;
step 3: controlling the LCD panel to project the grating by the controller of the optical detection structure, and rotating the camera 90° successively for 4 times to obtain the four interference fringe images of the wafer; and
step 4: obtaining the bow and the thickness of the wafer based on the four interference fringe images of the wafer.

11. A method for detecting the thickness and the bow of the wafer used the system as claimed in claim 5, comprising:
step 1: transporting the wafer to a target position by the transportation mechanism;
step 2: transporting the wafer to the bearing structure through the plurality of vacuum suction cups;
step 3: controlling the LCD panel to project the grating by the controller of the optical detection structure, and rotating the camera 90° successively for 4 times to obtain the four interference fringe images of the wafer; and
step 4: obtaining the bow and the thickness of the wafer based on the four interference fringe images of the wafer.

12. A method for detecting the thickness and the bow of the wafer used the system as claimed in claim 6, comprising:
step 1: transporting the wafer to a target position by the transportation mechanism;
step 2: transporting the wafer to the bearing structure through the plurality of vacuum suction cups;
step 3: controlling the LCD panel to project the grating by the controller of the optical detection structure, and rotating the camera 90° successively for 4 times to obtain the four interference fringe images of the wafer; and
step 4: obtaining the bow and the thickness of the wafer based on the four interference fringe images of the wafer.

13. A computer device comprising a processor and a memory; wherein the memory stores computer executable instructions executable by the processor, and the processor is configured to execute the computer executable instructions to implement the method as claimed in claim 7.

14. A computer device comprising a processor and a memory; wherein the memory stores computer executable instructions executable by the processor, and the processor is configured to execute the computer executable instructions to implement the method as claimed in claim 8.

15. A computer device comprising a processor and a memory; wherein the memory stores computer executable instructions executable by the processor, and the processor is configured to execute the computer executable instructions to implement the method as claimed in claim 9.

16. A computer device comprising a processor and a memory; wherein the memory stores computer executable instructions executable by the processor, and the processor is configured to execute the computer executable instructions to implement the method as claimed in claim 10.

17. A computer device comprising a processor and a memory; wherein the memory stores computer executable instructions executable by the processor, and the processor is configured to execute the computer executable instructions to implement the method as claimed in claim 11.

18. A computer device comprising a processor and a memory; wherein the memory stores computer executable instructions executable by the processor, and the processor is configured to execute the computer executable instructions to implement the method as claimed in claim 12.

19. A computer-readable storage medium, storing computer executable instructions, wherein when the computer executable instructions are called and executed by a processor, the computer executable instructions are configured to make the processor to implement the method as claimed in claim 7.

20. A computer-readable storage medium, storing computer executable instructions, wherein when the computer executable instructions are called and executed by a processor, the computer executable instructions are configured to make the processor to implement the method as claimed in claim 8.

* * * * *